United States Patent
Jung (10) Patent No.: US 10,663,213 B2
(45) Date of Patent: May 26, 2020

(54) DEFROST HEAT DISCHARGE SYSTEM AND REFRIGERATOR HAVING THE SAME

(71) Applicant: LG Electronics Inc., Seoul (KR)

(72) Inventor: Kwangsoo Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 15/880,715

(22) Filed: Jan. 26, 2018

(65) Prior Publication Data

US 2018/0274847 A1  Sep. 27, 2018

(30) Foreign Application Priority Data

Mar. 27, 2017 (KR) .................. 10-2017-0038584

(51) Int. Cl.
*F25D 21/14* (2006.01)
*F25D 21/00* (2006.01)
(Continued)

(52) U.S. Cl.
CPC .............. *F25D 21/14* (2013.01); *F25B 13/00* (2013.01); *F25D 17/067* (2013.01); *F25D 21/008* (2013.01); *F25D 21/08* (2013.01); *F25B 2600/111* (2013.01); *F25D 2321/144* (2013.01); *F25D 2321/146* (2013.01); *F25D 2600/02* (2013.01); *Y02B 30/743* (2013.01)

(58) Field of Classification Search
CPC ...... F25D 21/00; F25D 21/14; F25D 2321/14; F25D 2321/144; F25D 2321/146; F25D 21/06; F25D 21/08; F25D 21/008
See application file for complete search history.

(56) References Cited

U.S. PATENT DOCUMENTS 5,499,514 A * 3/1996 Ho .................. F25D 17/047
62/291
2015/0192349 A1  7/2015 Junge et al.
(Continued)

FOREIGN PATENT DOCUMENTS

CN    205536807    8/2016
DE    102011085155  4/2013
(Continued)

OTHER PUBLICATIONS

European Extended Search Report in European Application No. 18154221.8, dated Jul. 25, 2018, 7 pages.

*Primary Examiner* — Edward F Landrum
*Assistant Examiner* — Daniel C Comings
(74) *Attorney, Agent, or Firm* — Fish & Richardson P.C.

(57) ABSTRACT

A defrost heat discharge system includes a drain duct configured to discharge heat from a defrost heater and to discharge condensed water that results from melting of frost on an evaporator by heat generated by the defrost heater, a drain pipe that connects a first space to a second space, that is configured to allow condensed water to flow from the first space to the second space, and that is configured to discharge heat generated by the defrost heater from the first space to the second space, a drain cap located at an end of the drain pipe and configured to open and close at least a portion of the drain pipe; and a condensing fan configured to receive heat from the defrost heater and discharge heat toward an outside of the second space based on the drain cap opening the portion of the drain pipe.

18 Claims, 5 Drawing Sheets

(51) Int. Cl.
  *F25D 17/06* (2006.01)
  *F25D 21/08* (2006.01)
  *F25B 13/00* (2006.01)

(56) References Cited

U.S. PATENT DOCUMENTS

2015/0245721 A1* 9/2015 Nugroho ............... A47F 3/0482
                                                    62/256
2015/0362246 A1  12/2015 Vijayan et al.

FOREIGN PATENT DOCUMENTS

| | | | | |
|---|---|---|---|---|
| JP | H07174454 | 7/1995 | | |
| JP | 10122726 | 5/1998 | | |
| JP | 2009008324 | 1/2009 | | |
| KR | JP2004053094 | 2/2004 | | |
| KR | 100708621 | 4/2007 | | |
| KR | 1020120019596 | 3/2012 | | |
| KR | 2012-0019596 A | * | 7/2012 | ............. F25D 21/14 |

* cited by examiner

DEFROST HEAT DISCHARGE SYSTEM AND REFRIGERATOR HAVING THE SAME

CROSS-REFERENCE TO RELATED APPLICATION

Pursuant to 35 USC § 119 (a), this application claims the benefit of an earlier filing date and priority to Korean Application No. 10-2017-0038584, filed on Mar. 27, 2017, the contents of which are incorporated by reference herein in its entirety.

FIELD

The present disclosure relates to a defrost heat discharge system that discharges heat generated by a defrost heater, and a refrigerator including the defrost heat discharge system.

BACKGROUND

A refrigeration cycle system may include a compressor, a condenser, an expansion device, and an evaporator that are connected in a closed loop and repeatedly perform a process of compressing and expanding refrigerant to generate cold air or hot air. For example, the refrigeration cycle system may be installed in a refrigerator to generate cold air or installed in an air conditioner to cool air in summer and heat air in winter.

In some examples, in order to enhance a heat transfer efficiency between a heat exchanger for evaporation and air, the refrigeration cycle system may periodically execute a defrosting operation, which switches a flowing direction of refrigerant by activating a defrost heater disposed adjacent to the refrigeration cycle system or a refrigerant switching valve disposed between the compressor and the condenser, to remove frost generated on a surface of the evaporator due to external moisture adhered or frozen to the surface of the evaporator during operation.

In some cases, where a refrigerator is equipped with a defrost system that allows high-temperature heat to be transferred to the refrigerator after completion of a defrosting operation, fresh food may be deteriorated by defrost heat.

In some examples where a cooling device is separately provided for cooling defrost heat, the cooling device may require additional energy.

SUMMARY

One aspect of the present disclosure is to provide a defrost heat discharge system that can maintain a freshness of food by externally discharging defrost heat, and a refrigerator having the same.

Another aspect of the present disclosure is to provide a defrost heat discharge system that can reduce cost and enhance energy efficiency by externally discharging defrost heat even without an additional component in the existing refrigeration cycle, and a refrigerator having the same.

According to one aspect of the subject matter described in this application, a defrost heat discharge system includes a drain duct configured to discharge heat from a defrost heater and to discharge condensed water that results from melting of frost on an evaporator by heat generated by the defrost heater, a drain pipe that connects a first space to a second space, that is configured to allow condensed water to flow from the first space to the second space, and that is configured to discharge heat generated by the defrost heater from the first space to the second space, a drain cap located at an end of the drain pipe and configured to open and close at least a portion of the drain pipe; and a condensing fan configured to receive heat from the defrost heater and discharge heat toward an outside of the second space based on the drain cap opening the portion of the drain pipe.

Implementations according to this aspect may include one or more of the following features. For example, the first space may include an evaporator accommodating portion configured to accommodate the evaporator and the drain duct. The second space may include a machine room that is configured to accommodate a compressor, a condenser, and the condensing fan, and the machine room may include a cover that covers at least a portion of the machine room and that allows heat to be discharged from the second space to the outside of the second space through the cover.

In some implementations, the system may further include a controller configured to control operation of the condensing fan and the drain cap, where the controller is configured to, based on the defrost heater being turned off, cause the drain cap to open the portion of the drain pipe, and drive the condensing fan for a preset time to discharge heat from the first space to the second space through the drain pipe. In some examples, the system may further include a first discharge pipe that is branched from the drain pipe, that protrudes toward the condensing fan, and that is configured to discharge heat generated by the defrost heater.

In some implementations, the system may further include a damper located at the first discharge pipe and configured to open and close at least a portion of the first discharge pipe. In some examples, the system may further include a second discharge pipe that is branched from the drain pipe, that protrudes from the drain pipe in a direction opposite to the condensing fan, and that is configured to discharge heat generated by the defrost heater. In some examples, the system may further include a suction fan that is located at the second discharge pipe, that is configured to receive heat from the second discharge pipe, and that is configured to discharge heat to the second space.

In some implementations, the drain duct may be located vertically below the evaporator. The drain duct may define a drain port that is connected to the drain pipe and that is configured to discharge condensed water generated from frost on the evaporator to the drain pipe. The drain duct may include a guide surface that is inclined toward the drain port and that is configured to guide condensed water to the drain port. The cover of the machine room may define a plurality of holes configured to discharge air from the second space to the outside of the second space.

In some implementations, the drain pipe may include a first end that is connected to the drain duct, and a second end that is connected to the machine room and that extends into an inside of the machine room. The drain cap may be rotatably coupled to the second end of the drain pipe and configured to open the drain pipe based on a water level of condensed water in the drain pipe exceeding a threshold water level. The condensing fan may be located in the machine room between the compressor and a portion of the drain pipe. The drain cap may be rotatably coupled to the second end of the drain pipe by a hinge.

According to another aspect, a refrigerator includes a refrigerator main body defining a storage chamber, a door located at a front surface of the refrigerator main body and configured to open and close at least a portion of the storage chamber, a refrigeration cycle system including a compressor, a condenser, an evaporator, and a condensing fan, the refrigeration cycle system being configured to supply cold air to the storage chamber, a defrost heater configured to remove frost on the evaporator, a drain duct located vertically below the evaporator and configured to discharge condensed water that has been generated by heating the frost on the evaporator by the defrost heater, a machine room located at a lower portion of the refrigerator main body and configured to accommodate the compressor, the condenser, and the condensing fan, a drain pipe that is configured to allow condensed water to flow from the drain duct to the machine room and that is configured to discharge heat of the defrost heater from the drain duct to the machine room, a drain cap located at an end of the drain pipe and configured to open and close at least a portion of the drain pipe, and a condensing fan configured to receive heat from the defrost heater and discharge heat to an outside based on the drain cap opening the portion of the drain pipe.

Implementations according to this aspect may include one or more of the following features. For example, the refrigerator may further include a controller configured to control the drain cap and determine a period of time for which the drain cap opens the portion of the drain pipe after the defrost heater is turned off. The controller may be further configured to determine that a water level of condensed water in the drain pipe exceeds a threshold water level. The controller may be further configured to, based on a determination that the water level of condensed water in the drain pipe exceeds the threshold water level, control the drain cap to open the portion of the drain pipe.

According to the present disclosure having the aforementioned configuration, the following effects can be obtained.

For example, since heat generated in a defrost heater is transferred to an outside without being transferred into a refrigerator, a refrigerating chamber and a freezing chamber can maintain a freshness of food stored therein.

As another example, heat generated by the defrost heater can be discharged to the outside without an additional component in the existing refrigerator, which may result in enhancing energy efficiency and contributing to save energy and reduce manufacturing cost and energy cost.

DETAILED DESCRIPTION

Hereinafter, description will be given of a defrost heat discharge system and a refrigerator having the same according to the present disclosure, with reference to the accompanying drawings. A singular representation may include a plural representation unless it represents a definitely different meaning from the context.

Figure 1:
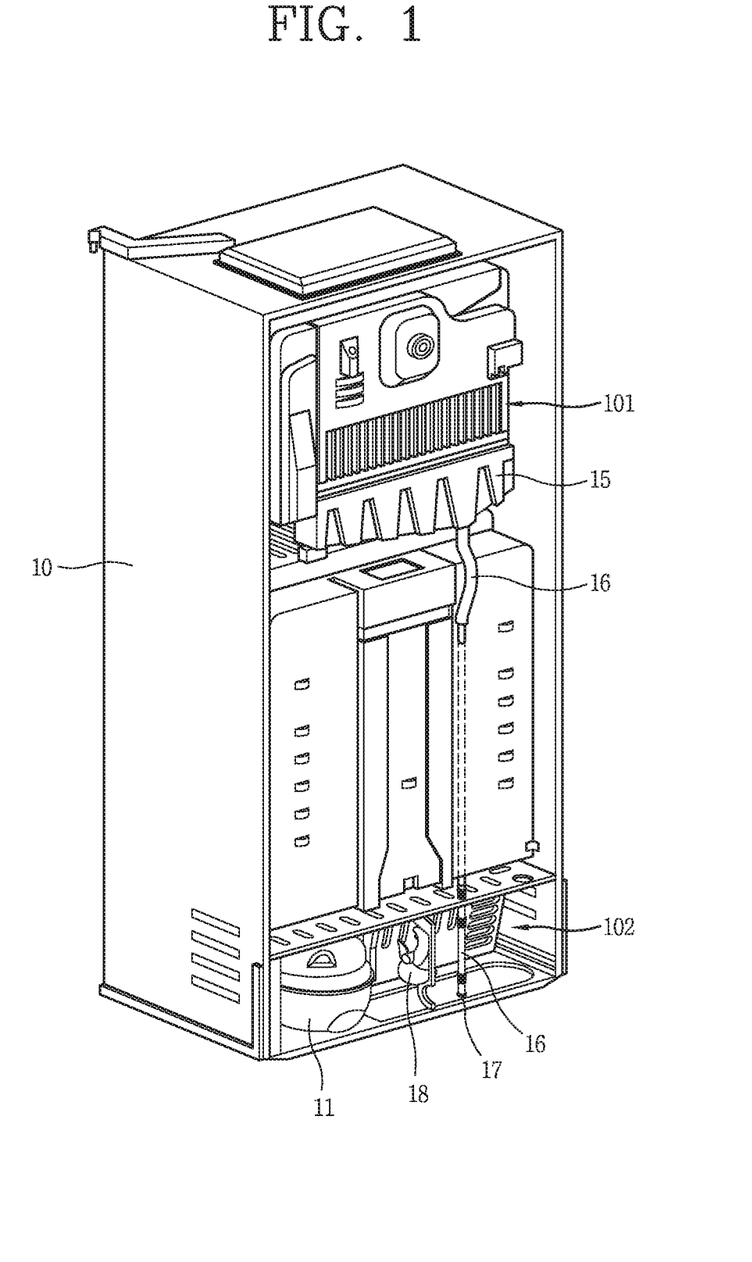
FIG. 1 is a conceptual view illustrating an example defrost heat discharge system located at an example rear surface of an example refrigerator.
Figure 2:
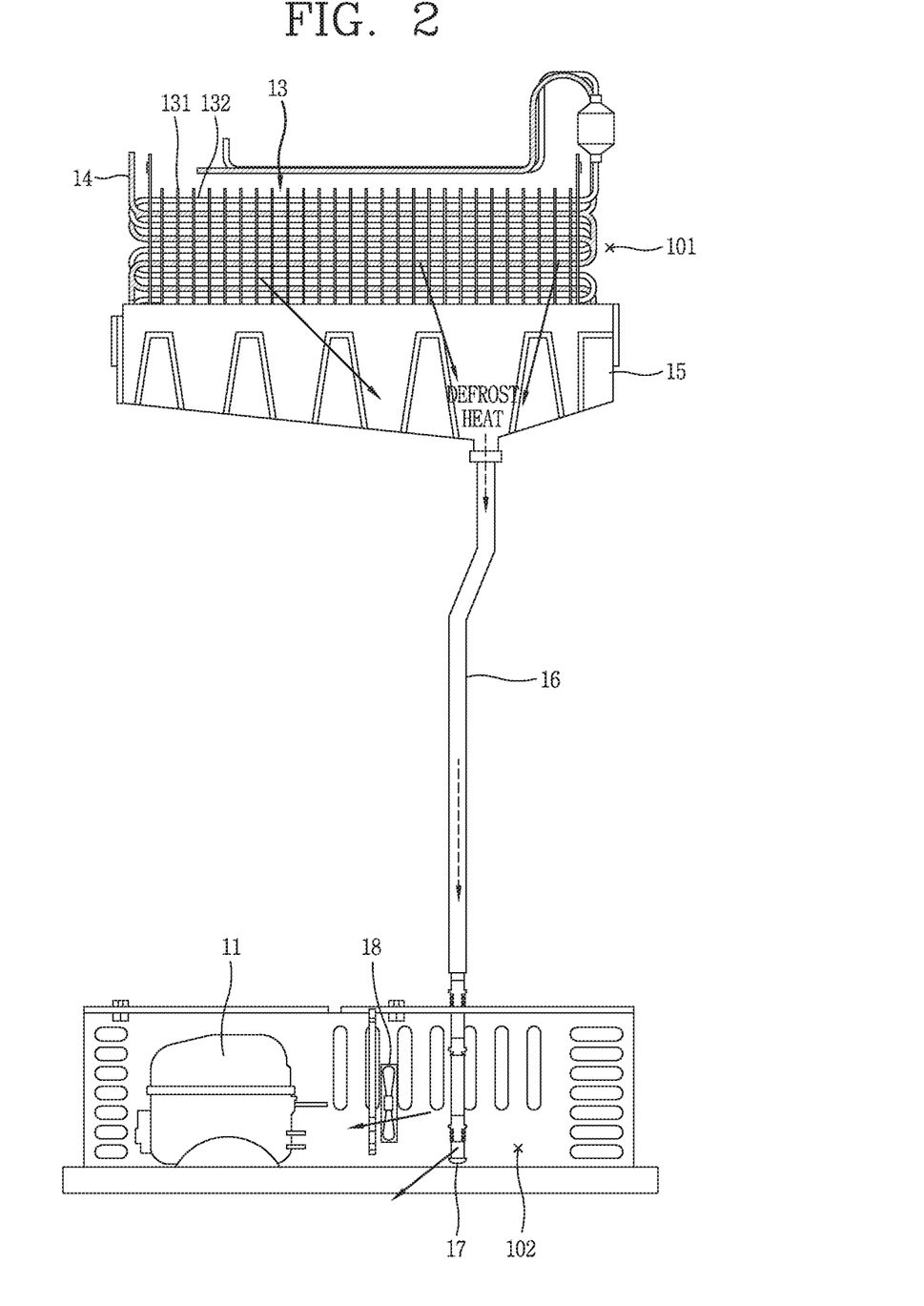
FIG. 2 is a conceptual view illustrating the defrost heat discharge system of FIG. 1.
Figure 3:
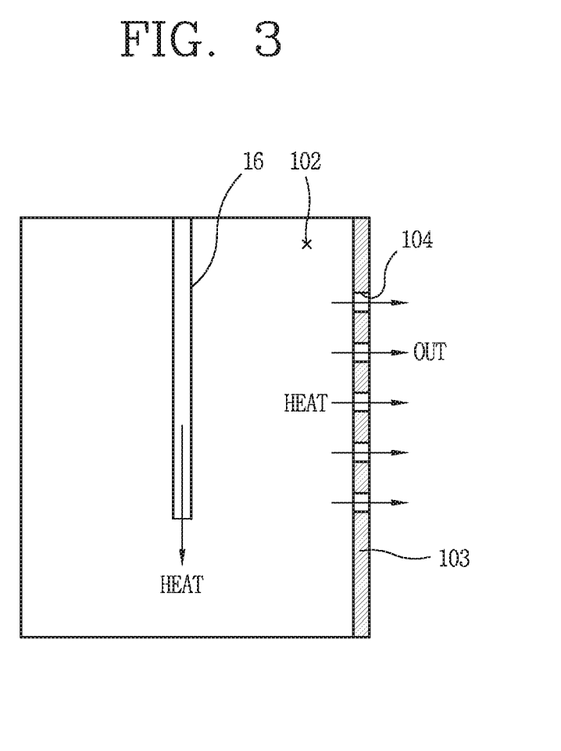
FIG. 3 is a conceptual view illustrating a state in which heat is externally discharged from an example machine room of FIG. 2.

FIG. 1 illustrates an example defrost heat discharge system that is applied to an example rear surface of a refrigerator, FIG. 2 illustrates the defrost heat discharge system of FIG. 1, and FIG. 3 illustrates a state in which heat is externally discharged from an example machine room of FIG. 2.

A refrigerator may include a storage chamber in a refrigerator main body 10 to store food items. For example, the storage chamber may include a freezing chamber located at an upper portion of the refrigerator main body 10, and a refrigerating chamber located at a lower portion of the refrigerator main body 10.

A refrigeration cycle system may be installed in a rear surface of the refrigerator main body 10, and the refrigeration cycle system may be provided with a compressor 11, a condenser, an expansion device, an evaporator 13, and the like, so as to generate cold air.

Cold air generated through heat exchange with the evaporator 13 may be transferred into the freezing chamber or the refrigerating chamber by a blower, and cold air discharged from the freezing chamber or the refrigerating chamber may circulate back into the evaporator 13. The food items stored in the freezing chamber or the refrigerating chamber may be kept fresh at a preset temperature by the cold air.

The evaporator 13 may be disposed in an upper portion of the rear of the refrigerator main body 10. The evaporator 13 may include a fin-and-tube type heat exchanger which includes heat exchange fins 131 arranged closely in a plate shape, and a refrigerant pipe 132 through which refrigerant flows to exchange heat with air.

In some examples, a defrost heater 14 may be disposed along the refrigerant pipe 132 and configured to heat frost adhered on the evaporator 13 so as to remove the frost from the evaporator 13.

The refrigerator main body 10 may include a first space 101 and a second space 102. For example, the refrigerator main body 10 may be partitioned into a first space 101 for accommodating the evaporator 13 and a second space 102 for accommodating the compressor 11, the condenser, and the condensing fan 18. The first space 101 may be located at an upper portion of the refrigerator main body 10, and the second space 102 may be located at a lower portion of the refrigerator main body 10. The second space 102 may be a machine room. A lower cover 103 may be provided on the rear of the machine room to cover the machine room. A plurality of discharge holes 104 may be defined through the lower cover 103 so that internal air of the machine room can be discharged out of the machine room and external air can be introduced into the machine room therethrough.

A drain duct 15 may be disposed below the evaporator 13. In some examples, frost on the evaporator 13 may be heated and condensed by the defrost heater 14, and condensed water may be discharged through the drain duct 15. An upper portion of the drain duct 15 may be opened toward the evaporator 13 so that the condensed water can be introduced into the drain duct 15, and side and lower surfaces of the drain duct 15 may be closed so as to form a condensed water storage space in the drain duct 15. A drain port may be formed on the lower surface of the drain duct 15, and the lower surface of the drain duct 15 may be downwardly inclined toward the drain port such that the condensed water can flow into the drain port.

A drain pipe 16 may include an upper end that is connected to and communicate with the drain duct 15 through the drain port, and a lower end that is connected to the machine room. The lower end of the drain pipe 16 may extend downward and protrude into an inner space of the machine room.

A drain cap 17 may be provided on the lower end of the drain pipe 16, and the drain cap 17 may be selectively opened and closed. The drain cap 17 may be opened when condensed water is filled in a lower portion of the drain pipe 16 by a predetermined water level or more, so that the condensed water can be discharged to outside. The drain cap 17 may be opened and closed by being rotatably coupled to the lower end of the drain pipe by a hinge. The drain cap 17 may be driven by a driving unit. The drain cap 17 may be opened and closed by a motor or a solenoid valve which is operated by an electric control signal.

The condensing fan 18 may be disposed between the compressor 11 and the drain pipe 16 extending into the machine room. The condensing fan 18 may be disposed between the condenser and the compressor 11 to cool the condenser and the compressor 11.

A controller 19 (see FIG. 7) may control not only an overall operation of the refrigerator but also the defrost heater 14, the condensing fan 18 and the drain cap 17. For example, the condensing fan 18 may receive a control signal from the controller 19 so as to be operated for a preset time after the operation of the defrost heater 14 is terminated, for example, when the defrost heater 14 is turned off. The drain cap 17 may also receive a control signal from the controller 19 so as to be opened for the preset time after the defrost heater 14 is turned off.

A temperature sensor may be provided in each of the freezing chamber and the refrigerating chamber in order to determine whether or not defrost heat has been discharged to outside.

The controller 19 may receive a detection signal from the temperature sensor while the defrost heat discharge system is operated after the defrost heater 14 is turned off, to determine whether or not the temperature of the refrigerating chamber or freezing chamber has dropped.

Hereinafter, a control method and an operating state of the defrost heat discharge system according to the present disclosure will be described.

The controller 19 turns on or activates the defrost heater 14 to remove frost generated on the evaporator 13. When the defrost heater 14 is powered on, heat generated in the defrost heater 14 may melt and condense the frost.

The condensed water generated in the evaporator 13 may flow down to be collected in the drain duct 15. When the condensed water flows down along the drain pipe 16 to be filled in the drain pipe 16 up to a predetermined water level, the condensed water may be discharged to outside through the drain cap 17.

The controller 19 opens the drain cap 17 and activates the condensing fan 18 after the defrost heater 14 is turned off.

As the condensing fan 18 is operated, the interior of the machine room falls into a negative pressure state lower than atmospheric pressure, and internal air of the drain pipe 16 is suctioned into the machine room by the negative pressure.

As a consequence, the heat generated in the defrost heater 14 may be suctioned into the drain duct 15 by the negative pressure, and then discharged into the machine room through the opened drain cap 17. In addition, internal heat of the machine room may be discharged out of the refrigerator main body 10 through discharge holes 104 defined at the lower cover 103.

Figure 4:
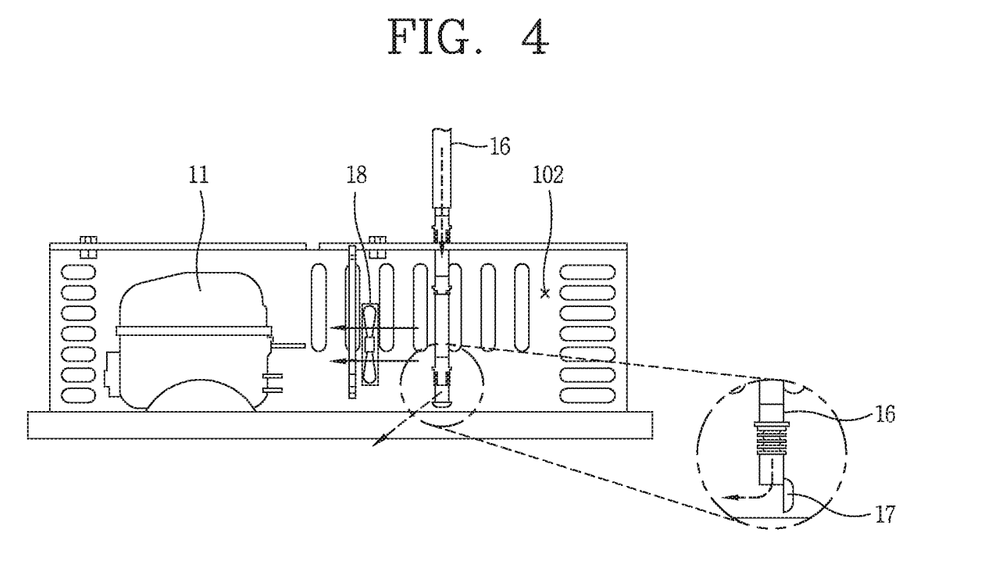
FIG. 4 is a conceptual view illustrating an example operating state of the defrost heat discharge system.

FIG. 4 illustrates an example operating state of the defrost heat discharge system.

FIG. 4 illustrates that heat, which is generated in the defrost heater 14 as the condensing fan 18 is operated, is suctioned along the drain pipe 16 and discharged into the machine room through the drain cap 17. Thus, heat inside the machine room is discharged to the outside through the discharge holes 104 of the lower cover 103.

Figure 5:
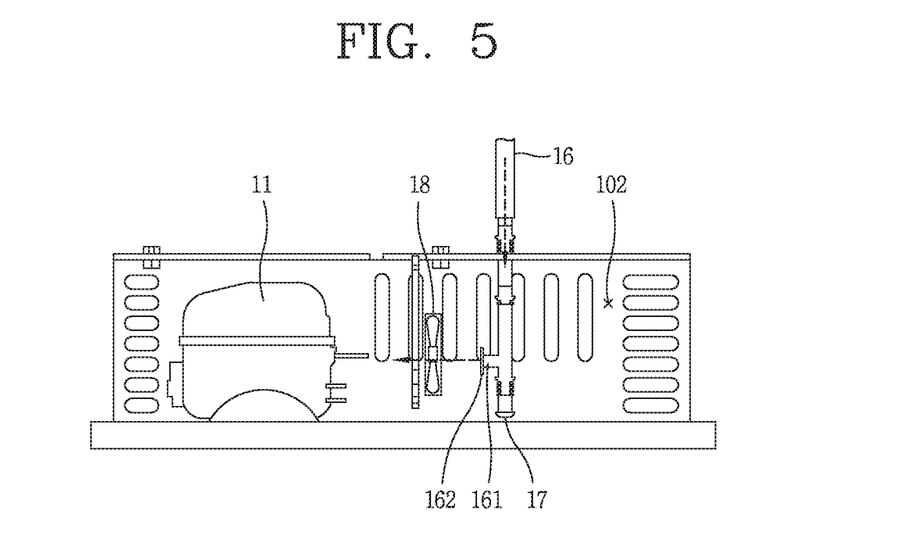
FIG. 5 is a conceptual view illustrating another example defrost heat discharge system.

FIG. 5 illustrates another example defrost heat discharge system.

This implementation differs from the first example illustrated in FIG. 4 in that a first defrost heat discharge pipe 161 is further provided on the drain pipe 16. For example, the first defrost heat discharge pipe 161 may be branched from the drain pipe 16 at a point upwardly spaced apart from the drain cap 17 along the drain pipe 16, and protrude toward the condensing fan 18. With this configuration, as the condensing fan 18 is operated, an air flow is caused in the machine room to generate negative pressure. Heat of the defrost heater 14 is suctioned into the drain duct 15 by the negative pressure, flows downward along the drain pipe 16, and then is discharged into the machine room through the drain cap 17. Heat inside the machine room is discharged to outside through the discharge holes 104 of the lower cover 103.

The first defrost heat discharge pipe 161 may be opened and closed by a damper 162. The damper 162 may be controlled by the controller 19 and may be opened for a preset time after the defrost heater 14 is turned off. The drain cap 17 may also be configured to be opened by the control of the controller 19 or a weight of the condensed water filled in the drain pipe 16 when the damper 162 is disposed on the first defrost heat discharge pipe 161. The other components are the same/like as those of the first implementation, and a detailed description thereof will be omitted.

Figure 6:
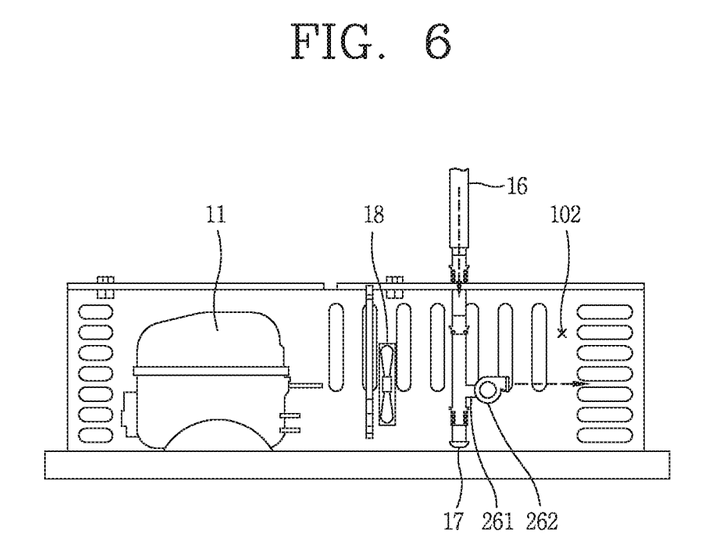
FIG. 6 is a conceptual view illustrating another example defrost heat discharge system.

FIG. 6 illustrates another example defrost heat discharge system.

This implementation differs from the first example illustrated in FIG. 4 in that a second defrost heat discharge pipe 261 and a suction fan 262 are further provided on the drain pipe 16. The second defrost heat discharge pipe 261 may be branched from the drain pipe at a point upwardly spaced apart from the drain cap 17 along the drain pipe 16, and protrude in an opposite direction to the condensing fan 18. The suction fan 262 may be provided in the second defrost heat discharge pipe 261 and operate independent of the condensing fan 18. With this configuration, as the suction fan 262 is operated by receiving a control signal from the controller 19, air in the drain pipe 16 is suctioned and thus negative pressure is generated. Heat of the defrost heater 14 is suctioned into the drain duct 15 by the negative pressure, flows downward along the drain pipe 16 and then is discharged into the machine room through the drain cap 17. Heat of the machine room is discharged to outside through the discharge holes 104 of the lower cover 103. In this case, the suction fan 262 may be mounted in the second defrost heat discharge pipe 261, thereby increasing suction force with respect to the defrost heat. Since heat of the second defrost heat discharge pipe 261 flows in an opposite direction to the compressor 11, heat transfer to the compressor 11 can be avoided. Accordingly, the cooling of the condenser with respect to the compressor 11 can be efficiently executed. The other components are the same/like as those of the first implementation, and a detailed description thereof will be omitted.

Figure 7:
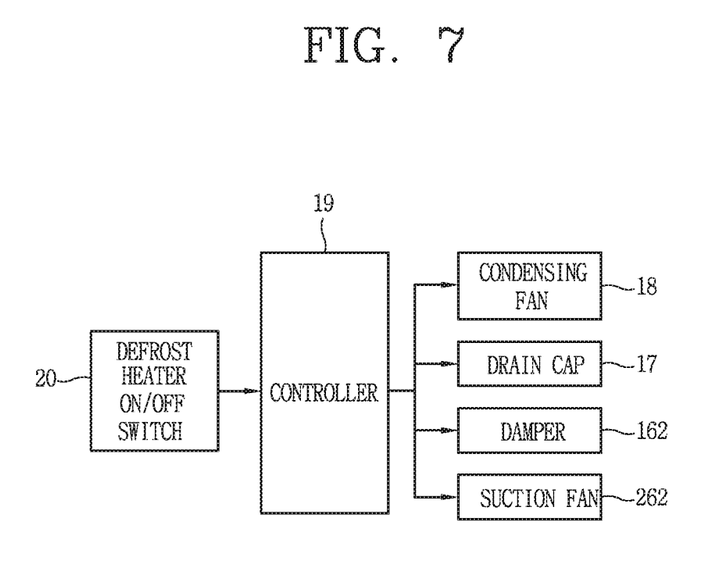
FIG. 7 is a block diagram of an example defrost heat discharge control device.

FIG. 7 is a block diagram of an example defrost heat discharge control device.

A defrost heater on/off switch 20 may be connected to a power supply unit, so that power can be selectively applied to the defrost heater 14 according to a control signal of the controller 19.

The controller 19 may determine a turn-off time point of the defrost heater 14 according to a defrost heat off signal.

In some implementations, the controller 19 may be electrically connected to driving units of the condensing fan 18 and the drain cap 17 to control the condensing fan 18 and the drain cap 17. The controller 19 may open the drain cap 17 and operate the condensing fan 18 for a preset time after the defrost heater 14 is turned off, so as to discharge the heat of the defrost heater 14 to the outside.

In some implementations, the controller 19 may be electrically connected to driving units of the condensing fan 18 and the damper 162 to control the condensing fan 18 and the damper 162. The controller 19 may open the damper 162 and operate the condensing fan 18 for a preset time after the defrost heater 14 is turned off, so as to discharge the heat of the defrost heater 14 to the outside.

In some implementations, the controller 19 may be electrically connected to a driving unit of the suction fan 262, to control the suction fan 262. The controller 19 may operate the suction fan 262 for a preset time after the defrost heater 14 is turned off, to discharge the heat of the defrost heater 14 to the outside.

In describing the present disclosure, if a detailed explanation for a related known function or construction is considered to unnecessarily divert the gist of the present disclosure, such explanation has been omitted but would be understood by those skilled in the art.

It will be apparent to those skilled in the art that various modifications and changes can be made in the present disclosure without departing from the spirit and scope of the disclosure as defined by the appended claims.

What is claimed is:

1. A defrost heat discharge system, comprising:
    a drain duct configured to discharge heat from a defrost heater and to discharge condensed water that results from melting of frost on an evaporator by heat generated by the defrost heater;
    a drain pipe that connects a first space to a second space, that is configured to allow condensed water to flow from the first space to the second space, and that is configured to discharge heat generated by the defrost heater from the first space to the second space;
    a drain cap located at an end of the drain pipe and configured to open and close at least a portion of the drain pipe;
    a condensing fan configured to receive heat from the defrost heater and discharge heat toward an outside of the second space based on the drain cap opening the portion of the drain pipe; and
    a controller configured to control operation of the condensing fan and the drain cap,
    wherein the controller is configured to, based on the defrost heater being turned off, cause the drain cap to open the portion of the drain pipe, and drive the condensing fan for a preset time to discharge heat from the first space to the second space through the drain pipe.

2. The system of claim 1, wherein the first space is configured to accommodate the evaporator and the drain duct.

3. The system of claim 1, wherein the second space includes a machine room that is configured to accommodate a compressor, a condenser, and the condensing fan, and wherein the machine room includes a cover that covers at least a portion of the machine room and that allows heat to be discharged from the second space to the outside of the second space through the cover.

4. The system of claim 3, further comprising a discharge pipe that is branched from the drain pipe, that protrudes toward the condensing fan, and that is configured to discharge heat generated by the defrost heater.

5. The system of claim 4, further comprising a damper located at the discharge pipe and configured to open and close at least a portion of the discharge pipe.

6. The system of claim 3, further comprising a discharge pipe that is branched from the drain pipe, that protrudes from the drain pipe in a direction opposite to the condensing fan, and that is configured to discharge heat generated by the defrost heater.

7. The system of claim 6, further comprising a suction fan that is located at the discharge pipe, that is configured to receive heat from the discharge pipe, and that is configured to discharge heat to the second space.

8. The system of claim 2, wherein the drain duct is located vertically below the evaporator.

9. The system of claim 8, wherein the drain duct defines a drain port that is connected to the drain pipe and that is configured to discharge condensed water generated from frost on the evaporator to the drain pipe.

10. The system of claim 9, wherein the drain duct includes a guide surface that is inclined toward the drain port and that is configured to guide condensed water to the drain port.

11. The system of claim 3, wherein the cover of the machine room defines a plurality of holes configured to discharge air from the second space to the outside of the second space.

12. The system of claim 3, wherein the drain pipe includes a first end that is connected to the drain duct, and a second end that is connected to the machine room and that extends into an inside of the machine room.

13. The system of claim 12, wherein the drain cap is rotatably coupled to the second end of the drain pipe and configured to open the drain pipe based on a water level of condensed water in the drain pipe exceeding a threshold water level.

14. The system of claim 12, wherein the condensing fan is located in the machine room between the compressor and a portion of the drain pipe.

15. The system of claim 12, wherein the drain cap is rotatably coupled to the second end of the drain pipe by a hinge.

16. A refrigerator, comprising:
    a refrigerator main body defining a storage chamber;
    a door located at a front surface of the refrigerator main body and configured to open and close at least a portion of the storage chamber;
    a refrigeration cycle system comprising a compressor, a condenser, an evaporator, and a condensing fan, the refrigeration cycle system being configured to supply cold air to the storage chamber;
    a defrost heater configured to remove frost on the evaporator;
    a drain duct located vertically below the evaporator and configured to discharge condensed water that has been generated by heating the frost on the evaporator by the defrost heater;
    a machine room located at a lower portion of the refrigerator main body and configured to accommodate the compressor, the condenser, and the condensing fan;

a drain pipe that is configured to allow condensed water to flow from the drain duct to the machine room and that is configured to discharge heat of the defrost heater from the drain duct to the machine room;

a drain cap located at an end of the drain pipe and configured to open and close at least a portion of the drain pipe;

a condensing fan configured to receive heat from the defrost heater and discharge heat to an outside based on the drain cap opening the portion of the drain pipe; and a controller configured to control the drain cap and determine a period of time for which the drain cap opens the portion of the drain pipe after the defrost heater is turned off.

17. The refrigerator of claim 16, wherein the controller is further configured to determine that a water level of condensed water in the drain pipe exceeds a threshold water level.

18. The refrigerator of claim 17, wherein the controller is further configured to, based on a determination that the water level of condensed water in the drain pipe exceeds the threshold water level, control the drain cap to open the portion of the drain pipe.

* * * * *